(12) United States Patent
Xu (10) Patent No.: US 11,526,276 B2
(45) Date of Patent: Dec. 13, 2022

(54) UPGRADE MANAGEMENT METHOD AND SCHEDULING NODE, AND STORAGE SYSTEM

(71) Applicant: HUAWEI TECHNOLOGIES CO., LTD., Guangdong (CN)

(72) Inventor: Fei Xu, Beijing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 60 days.

(21) Appl. No.: 16/822,754

(22) Filed: Mar. 18, 2020

(65) Prior Publication Data

US 2020/0218453 A1 Jul. 9, 2020

Related U.S. Application Data

(63) Continuation of application No. PCT/CN2018/086299, filed on May 10, 2018.

(30) Foreign Application Priority Data

Sep. 20, 2017 (CN) .......................... 201710851312.7

(51) Int. Cl.
*G06F 3/06* (2006.01)
*G06F 9/38* (2018.01)
(Continued)

(52) U.S. Cl.
CPC ............ *G06F 3/0607* (2013.01); *G06F 3/067* (2013.01); *G06F 3/0659* (2013.01);
(Continued)

(58) Field of Classification Search
CPC ...... G06F 3/0607; G06F 3/0659; G06F 3/067; G06F 3/0683; G06F 9/3885; G06F 9/4881; H04L 41/082; H04L 67/06
See application file for complete search history.

(56) References Cited

U.S. PATENT DOCUMENTS

2016/0182614 A1* 6/2016 Udupi ................. H04L 41/0893
709/217
2017/0141968 A1* 5/2017 Lloyd ................. H04L 41/0886
(Continued)

FOREIGN PATENT DOCUMENTS

| CN | 101741894 A | 6/2010 |
|----|-------------|--------|
| CN | 102055785 A | 5/2011 |

(Continued)

OTHER PUBLICATIONS

XP033047942 Mina Nabi et al.,"Rolling Upgrade with Dynamic Batch Size for Iaas Cloud",2016 IEEE 9th International Conference on Cloud Computing,total 4 pages.

*Primary Examiner* — Ernest Unelus
(74) *Attorney, Agent, or Firm* — Womble Bond Dickinson (US) LLP (57) ABSTRACT

A storage system and method for performing upgrade management are provided. A plurality of nodes in the storage systems are divided into groups. A scheduling node obtains a constraint condition of each group. The constraint condition comprises a maximum quantity of nodes in a corresponding group that are allowed to be upgraded in parallel. Nodes in a first batch for upgrading in parallel from the groups based on the constraint condition of each group are selected. An upgrade instruction is sent to the nodes in the first batch.

19 Claims, 7 Drawing Sheets

(51) Int. Cl.
*G06F 9/48* (2006.01)
*H04L 41/082* (2022.01)
*H04L 67/06* (2022.01)

(52) U.S. Cl.
CPC .......... *G06F 3/0683* (2013.01); *G06F 9/3885* (2013.01); *G06F 9/4881* (2013.01); *H04L 41/082* (2013.01); *H04L 67/06* (2013.01)

(56) References Cited

U.S. PATENT DOCUMENTS

2017/0155550 A1\* 6/2017 Cooper .................. H04L 67/06
2018/0367379 A1 12/2018 Guo

FOREIGN PATENT DOCUMENTS

| | | |
|---|---|---|
| CN | 104094248 A | 10/2014 |
| CN | 105786405 A | 7/2016 |
| CN | 106354531 A | 1/2017 |
| CN | 106936622 A | 7/2017 |
| EP | 2651158 A1 | 10/2013 |
| EP | 3399692 A1 | 11/2018 |
| WO | 2016176060 A1 | 11/2016 |

\* cited by examiner

UPGRADE MANAGEMENT METHOD AND SCHEDULING NODE, AND STORAGE SYSTEM

CROSS-REFERENCE TO RELATED APPLICATION

This application is a continuation of International Application No. PCT/CN2018/086299, filed on May 10, 2018, which claims priority to Chinese Patent Application No. 201710851312.7, filed on Sep. 20, 2017. The disclosures of the aforementioned applications are hereby incorporated by reference in their entireties.

TECHNICAL FIELD

Embodiments of the invention relate to the field of storage technologies, and in particular, to a distributed storage system upgrade management method and apparatus, and a distributed storage system.

BACKGROUND

Figure 1:
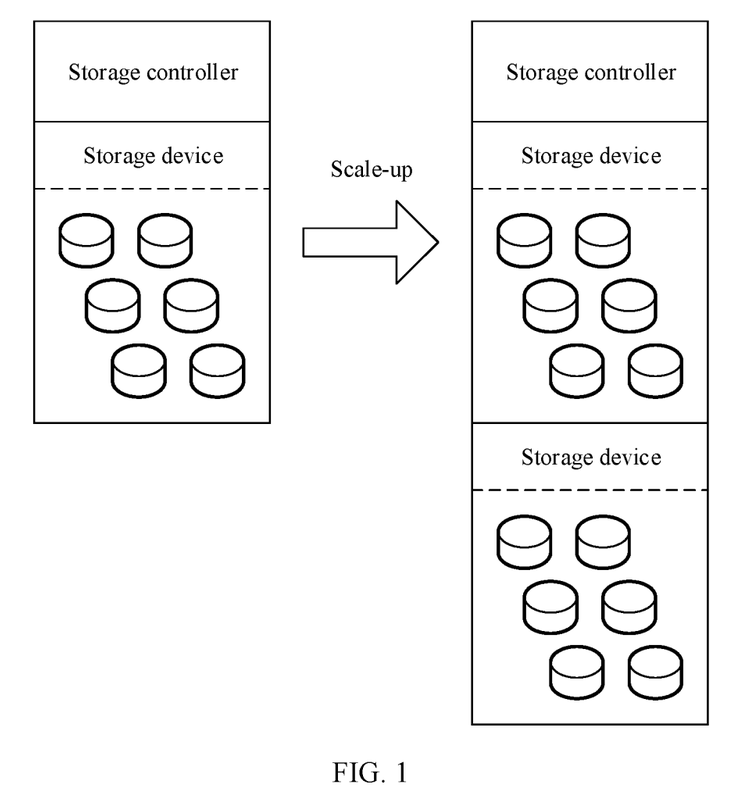
FIG. 1 is a schematic diagram of a scale-up architecture.
Figure 2:
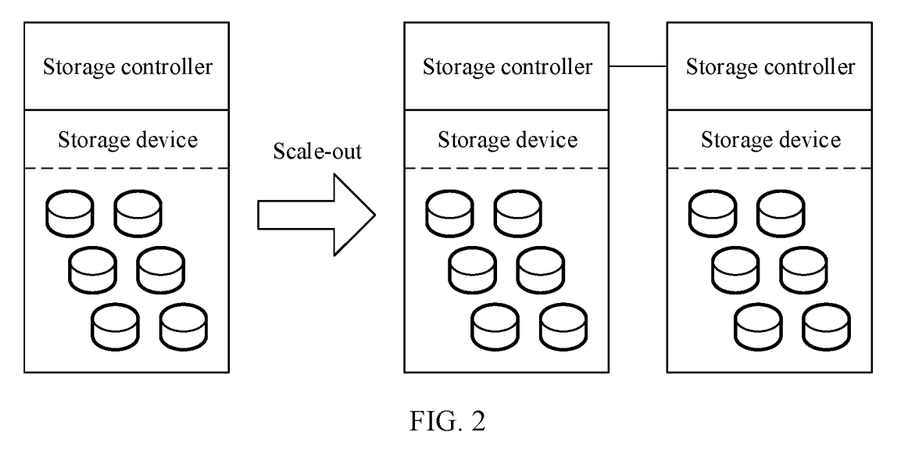
FIG. 2 is a schematic diagram of a scale-out architecture.

In a distributed storage system, data is distributed and stored on a plurality of independent devices. The distributed storage system uses a scalable system structure. The plurality of independent devices are used to share storage loads, to improve reliability, performance, and a capacity of the storage system and facilitate expansion. Currently, a common architecture of the distributed storage system includes a scale-up architecture shown in FIG. 1 and a scale-out rchitecture shown in FIG. 2. The scale-up architecture means that a capacity of a single device is increased or the device is upgraded in an original storage system to meet a growth requirement in data and performance (that is, a storage controller uniformly manages a plurality of storage devices disposed in a same device). The scale-out architecture means that capacity expansion is performed in an original storage system by adding nodes (that is, at least one device including a storage device and a storage controller is added, and two adjacent devices exchange data by using respective storage controllers), where each node can provide a capacity, bandwidth, and computing.

Figure 3:
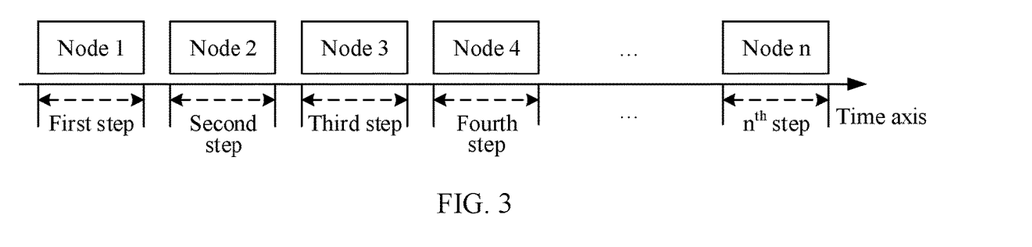
FIG. 3 is a schematic diagram of a rolling upgrade of a distributed storage system according to a rolling upgrade manner.

In an upgrade process of the distributed storage system, a node being upgraded needs to be restarted. In a process of restarting the node, another node in the distributed storage system needs to take over a service executed by the node. Therefore, in an upgrade process of the scale-out architecture, currently, the distributed storage system is upgraded in a rolling upgrade manner, to minimize an impact on system performance. As shown in FIG. 3, nodes are upgraded one by one from left to right according to a time axis. In other words, after a current node is upgraded, a next adjacent node is upgraded (that is, nodes are upgraded in sequence from a node 1 to a node n, where n is an integer greater than 1).

However, as service requirements increase, a large quantity of nodes, for example, hundreds of nodes, are usually deployed in a same distributed storage system. If the system is upgraded in the foregoing rolling upgrade manner, the system upgrade may last for several days. As a result, upgrade efficiency of the distributed system is reduced.

SUMMARY

Embodiments of the invention provide a distributed storage system upgrade management method and apparatus, and a distributed storage system, to resolve a problem of excessively low upgrade efficiency of the distributed storage system.

The following technical solutions are adopted in the embodiments of the invention:

An embodiment of the invention provides a distributed storage system upgrade management method. The method is applied to a scheduling node in a distributed storage system. The distributed storage system includes a plurality of nodes. Each node belongs to at least one group. The method includes: obtaining, by the scheduling node, a constraint condition of each group in the distributed storage system; determining, by the scheduling node, a first upgrade solution based on the constraint condition of each group; and sending, by the scheduling node, an upgrade instruction to the plurality of nodes in each batch according to the first upgrade solution. The constraint condition includes a maximum quantity of nodes in each group that are allowed to be upgraded in parallel. The first upgrade solution includes: grouping the plurality of nodes into at least one batch, where all nodes in each batch meet each constraint condition. In comparison with a rolling upgrade manner, in the embodiment of the invention, the scheduling node may determine, based on the constraint condition of each of a plurality of groups, the first upgrade solution that meets the constraint condition of each group, and upgrade, according to the first upgrade solution, all nodes that need to be upgraded in each batch. It can be learned that a quantity of nodes in an upgrade state at a same moment increases from one to more. In addition, there is relatively small interference between the plurality of nodes that are upgraded simultaneously. For example, because the plurality of nodes that are upgraded simultaneously have different functions, tasks executed on the plurality of nodes that are in the upgrade process are allocated to other nodes that have same functions for execution; or because the plurality of nodes that are upgraded simultaneously are deployed in different physical areas, the plurality of nodes in the upgrade process are dispersed, and system performance is not greatly reduced due to centralized upgrade. Therefore, this parallel upgrade manner is used to not only ensure system reliability, but also save a time consumed for system upgrade. In this way, a problem of excessively low upgrade efficiency of the distributed storage system is resolved.

In a possible design, nodes belonging to a same group have a same function or belong to a same physical area. In an upgrade process of a node, a service being executed on the node needs to be executed by another node instead. Generally, the service that is not completely executed is handed over to a node that has a same function for completion, to ensure successful execution of the service. In this case, a load of the node that has the same function as the node in the upgrade process is inevitably increased. However, in an actual service execution process, if there are a large quantity of nodes that have a same function in nodes in an upgrade state at a same moment, a node that has the function and that is in a normal working state definitely has an excessively high load or is even overloaded. As a result, working performance of the node that has the function and that is in the normal working state is reduced, and execution efficiency of this type of service is affected. Therefore, in the embodiment of the invention, in a process of determining an upgrade solution, a limitation caused by a function of a node to a parallel upgrade needs to be considered. Similarly, if a large quantity of nodes that are upgraded at a same moment exist in a plurality of nodes deployed in a same physical area, a large quantity of idle resources exist in the physical area. In addition, to avoid extra resource waste caused by an excessively long transmission path between two nodes, in a node deployment process, a plurality of nodes that have a joint relationship in a service processing process are usually deployed in a same physical area. If the nodes are upgraded at a same moment, services being executed on these nodes are handed over to other nodes that have the same functions for execution. If the nodes that execute the type of service after the handover are deployed in different physical areas, it is possible to cause excessive waste of transmission resources, and reduce the execution efficiency of the type of service. Therefore, in the embodiment of the invention, in a process of determining an upgrade solution, a limitation caused by a physical area to which a node belongs to a parallel upgrade needs to be considered. For example, the group includes at least one of the following: a subsystem obtained after to-be-upgraded nodes are grouped based on a function of the to-be-upgraded nodes; and a node pool obtained after the to-be-upgraded nodes are grouped based on an area to which the to-be-upgraded nodes belong.

In a possible design, the determining, by the scheduling node, a first upgrade solution based on the constraint condition of each group includes:

a. selecting, from the plurality of nodes, a node that is not upgraded;

b. determining whether another node that is not upgraded in the plurality of nodes except the node that is not upgraded and each selected node that is not upgraded meet the constraint condition of each group, and if the another node and each selected node that is not upgraded meet the constraint condition of each group, selecting the another node that is not upgraded, until all the nodes that are not upgraded in the plurality of nodes are traversed; and c. grouping, into a batch, all the nodes that are not upgraded and that are selected in a and b; and repeating the process from a to c for nodes that are not upgraded and that are not selected, until batch division is completed for all the nodes that are not upgraded.

The foregoing implementation of generating the first upgrade solution is only a possible implementation. In the embodiment of the invention, another implementation of generating the first upgrade solution may be used, for example, a derivative manner of the foregoing implementation. For example, when the nodes that need to be upgraded are sorted, the nodes may be sorted in descending order of effects of the constraint condition on the nodes. To be specific, a node that is most limited by the constraint condition is used as the node that is not upgraded and that is selected in the foregoing operation 302, and a node that is second most limited by the constraint condition is used as the another node that is not upgraded and that is selected for the first time other than the node that is not upgraded. In the embodiment of the invention, it only needs to ensure that the generated first upgrade solution can meet the constraint condition of each group.

In a possible design, that the scheduling node obtains the constraint condition of each group in the distributed storage system may be implemented as follows: The scheduling node sends a constraint condition request message to all nodes that need to be upgraded, and then receives a constraint condition fed back by a node that serves as a primary node of each group and that is in all the nodes that need to be upgraded. In other that a constraint condition of a group is not omitted, in a possible implementation of the embodiment of the invention, the scheduling node may send the constraint condition request message separately to all the nodes that need to be upgraded, to obtain the constraint condition of each group.

An embodiment of the invention provides a distributed storage system upgrade management method. The method is applied to a scheduling node in a distributed storage system. The distributed storage system includes a plurality of nodes. Each node belongs to at least one group. The method includes: obtaining, by the scheduling node, a constraint condition of each group in the distributed storage system; determining, by the scheduling node, a first upgrade solution based on the constraint condition of each group; and sending, by the scheduling node, an upgrade instruction to some of the plurality of nodes in each batch according to the first upgrade solution. The constraint condition includes a maximum quantity of nodes in each group that are allowed to be upgraded in parallel. The first upgrade solution includes: grouping the plurality of nodes into at least one batch, where all nodes in each batch meet each constraint condition. In comparison with a rolling upgrade manner, in the embodiment of the invention, the scheduling node may determine, based on the constraint condition of each of a plurality of groups, the first upgrade solution that meets the constraint condition of each group, and upgrade, according to the first upgrade solution, some nodes that need to be upgraded in each batch. It can be learned that a quantity of nodes in an upgrade state at a same moment increases from one to more. In addition, there is no interference between the plurality of nodes that are upgraded simultaneously. Therefore, this parallel upgrade manner is used to not only ensure system reliability, but also save a time consumed for system upgrade. In this way, a problem of excessively low upgrade efficiency of the distributed storage system is resolved.

In a possible design, nodes belonging to a same group have a same function or belong to a same physical area.

In a possible design, after the scheduling node sends the upgrade instruction to some of the plurality of nodes in each batch according to the first upgrade solution, the scheduling node determines, for nodes that are not upgraded, a second upgrade solution that meets the constraint condition of each group, and send, according to the second upgrade solution, the upgrade instruction to at least some of the nodes that are not upgraded in each batch. The first upgrade solution is different from the second upgrade solution. The second upgrade solution includes: grouping, into at least one batch, the nodes that are not upgraded. In addition, it is considered that the quantity of nodes that need to be upgraded decreases after the upgrade process of nodes in some batches is completed, and more nodes can be upgraded in a batch after the quantity of nodes that need to be upgraded decreases. In this case, before a batch is upgraded according to the first upgrade solution, it may be found that the first upgrade solution is not a current best or better upgrade solution. To upgrade nodes that need to be upgraded in a same batch as many as possible and to save an upgrade time of the distributed storage system, the scheduling node may complete the upgrade process of nodes in only one batch or several batches according to the first upgrade solution, then generate the second upgrade solution based on the obtained constraint condition, and complete, according to the second upgrade solution, an upgrade process of remaining nodes that need to be upgraded. The first upgrade solution is different from the second upgrade solution. In an implementation, a plurality of upgrade solutions are generated. In comparison with this implementation, only the first upgrade solution is generated, to minimize occupied system resources when the nodes are upgraded in parallel. In an implementation, only the first upgrade solution is generated. In comparison with this implementation, the plurality of upgrade solutions are generated, to save a time consumed for upgrading a same node to some extent, improve upgrade efficiency of the system, and minimize an impact on a service being executed.

In a possible design, the determining, by the scheduling node, a first upgrade solution based on the constraint condition of each group includes:

a. selecting, from the plurality of nodes, a node that is not upgraded;

b. determining whether another node that is not upgraded in the plurality of nodes except the node that is not upgraded and each selected node that is not upgraded meet the constraint condition of each group, and if the another node and each selected node that is not upgraded meet the constraint condition of each group, selecting the another node that is not upgraded, until all the nodes that are not upgraded in the plurality of nodes are traversed; and c. grouping, into a batch, all the nodes that are not upgraded and that are selected in a and b; and repeating the process from a to c for nodes that are not upgraded and that are not selected, until batch division is completed for all the nodes that are not upgraded.

In order that the system upgrade process more meets current requirements of the maintenance personnel, for example, in order to minimize the time occupied by the system upgrade, in a possible implementation of the embodiment of the invention, the scheduling node may upgrade only some of the plurality of to-be-upgraded nodes in each batch according to the first upgrade solution, then determines the second upgrade solution for to-be-upgraded nodes that are not upgraded, and upgrades, by using the second upgrade solution, some or all of the to-be-upgraded nodes that are not upgraded in each batch. Similarly, if only some to-be-upgraded nodes are upgraded, a third upgrade solution needs to be generated, and so on, until all the to-be-upgraded nodes are upgraded.

An embodiment of the invention provides a distributed storage system upgrade management apparatus. The apparatus may implement functions implemented in the embodiments of the methods as described herein. The functions may be implemented by hardware, or may be implemented by hardware by executing corresponding software. The hardware or the software includes one or more modules corresponding to the foregoing functions.

In a possible design, the apparatus is applied to a scheduling node, and a structure of the scheduling node includes a processor and a communications interface. The processor is configured to support the apparatus in performing corresponding functions in the foregoing method. The communications interface is configured to support communication between the scheduling node and another device. The apparatus may further include a memory. The memory is configured to couple with the processor, and the memory stores a program instruction and data for the apparatus.

An embodiment of the invention provides a distributed storage system upgrade management apparatus. The apparatus may implement functions implemented in embodiments of the methods as described herein. The functions may be implemented by hardware, or may be implemented by hardware by executing corresponding software. The hardware or the software includes one or more modules corresponding to the foregoing functions.

In a possible design, the apparatus is applied to a scheduling node, and a structure of the scheduling node includes a processor and a communications interface. The processor is configured to support the apparatus in performing corresponding functions in the foregoing method. The communications interface is configured to support communication between the scheduling node and another device. The apparatus may further include a memory. The memory is configured to couple with the processor, and stores a program instruction and data for the apparatus.

An embodiment of the invention provides a distributed storage system. The distributed storage system includes a scheduling node, and the scheduling node includes one or more embodiments of the apparatus as described herein.

An embodiment of the invention provides a computer readable medium. The computer readable medium stores a computer program. When the computer program is loaded on a computer and executed by the computer, the computer is enabled to perform any one of embodiments of the method as described herein.

An embodiment of the invention provides a computer program product. The computer program product includes a computer program. When the computer program is executed by a computer, the computer is enabled to perform any one of embodiments of the method as described herein.

DESCRIPTION OF EMBODIMENTS

The following describes technical solutions in the embodiments of the invention with reference to the accompanying drawings in the embodiments of the invention.

The embodiments of the invention are applicable to a distributed storage system. The distributed storage system includes a plurality of storage devices. The storage device is, for example, a computer or a server, and includes a processor and a storage medium. In the embodiments of the invention, the storage device may also be referred to as a node. Each node belongs to at least one group. Nodes belonging to a same group have a same function or belong to a same physical area. It should be noted that a service being executed on a node needs to be executed by another node instead in an upgrade process of the node. Generally, a service that is not completely executed is handed over to a node that has a same function for completion, to ensure successful execution of the service. In this case, a load of the node that has the same function as the node in the upgrade process is inevitably increased. However, in an actual service execution process, if there are a large quantity of nodes that have a same function in nodes in an upgrade state at a same moment, a node that has the function and that is in a normal working state definitely has an excessively high load or is even overloaded. As a result, working performance of the node that has the function and that is in the normal working state is reduced, and execution efficiency of this type of service is affected.

Therefore, in the embodiments of the invention, in a process of determining an upgrade solution, a limitation caused by a function of a node to a parallel upgrade needs to be considered. Similarly, if a large quantity of nodes that are upgraded at a same moment exist in a plurality of nodes deployed in a same physical area, a large quantity of idle resources exist in the physical area. In addition, to avoid extra resource waste caused by an excessively long transmission path between two nodes, in a node deployment process, a plurality of nodes that have a joint relationship in a service processing process are usually deployed in a same physical area. If the nodes are upgraded at a same moment, services being executed on these nodes are handed over to other nodes that have the same functions for execution. If the nodes that execute the type of service after the handover are deployed in different physical areas, it is possible to cause excessive waste of transmission resources, and reduce the execution efficiency of the type of service. Therefore, in the embodiments of the invention, in a process of determining an upgrade solution, a limitation caused by a physical area to which a node belongs to a parallel upgrade needs to be considered. It can be learned that, in a process of setting a group, a limitation brought by an actual case of each node to the parallel upgrade needs to be considered. For example, in the embodiments of the invention, the group includes at least one of the following: a subsystem obtained after to-be-upgraded nodes are grouped based on a function of the to-be-upgraded nodes; and a node pool obtained after the to-be-upgraded nodes are grouped based on an area to which the to-be-upgraded nodes belong. It should be noted that, the foregoing grouping manner is only a possible implementation, and is not limited in the embodiments of the invention. The personnel may adjust the grouping manner with reference to an actual case of the distributed storage system, for example, an execution status of a service, a load status of a node, and the like. This is not limited herein.

Based on the foregoing grouping manner, a concept of a constraint condition is introduced into the embodiments of the invention. The constraint condition includes a maximum quantity of nodes that are allowed to be upgraded simultaneously in each group. A purpose of setting the constraint condition is to avoid a great impact on service execution or system performance caused by the parallel upgrade.

In other words, a common grouping manner is grouping, into a same group, nodes that are unsuitable to be restarted simultaneously. A reason why these nodes are unsuitable to be restarted simultaneously is that an unacceptable impact is caused to system performance if these nodes are restarted simultaneously. Therefore, a constraint condition is correspondingly set for each group, to prevent an excessively large quantity of nodes from being restarted simultaneously. The constraint condition is a maximum quantity of nodes that can be restarted simultaneously in a group.

Figure 4:
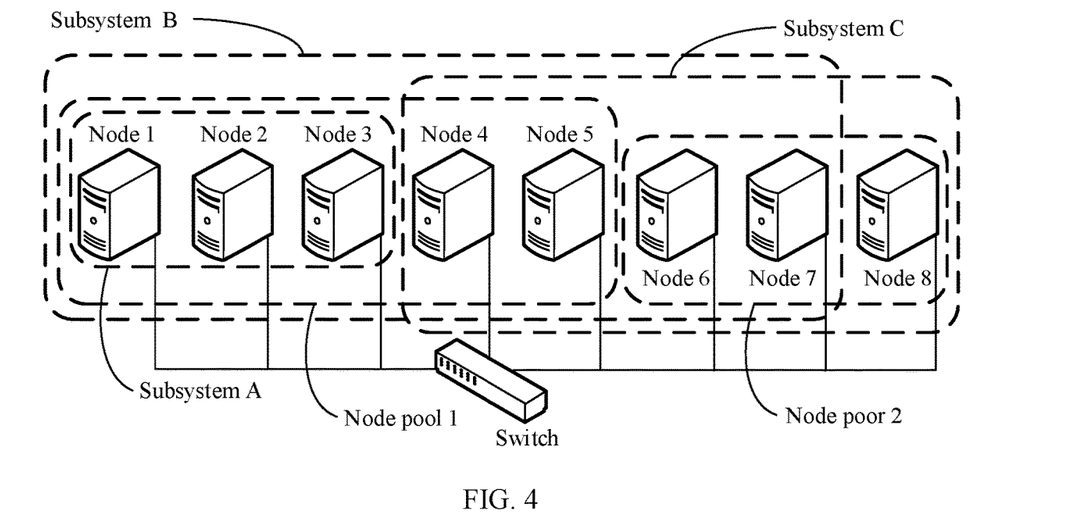
FIG. 4 is a schematic diagram of a distributed storage system according to an embodiment of the invention.

FIG. 4 is a schematic diagram of a possible distributed storage system according to an embodiment of the invention. The distributed storage system includes eight nodes that need to be upgraded, respectively a node 1 to a node 8. All the eight nodes that need to be upgraded can complete data exchange with a switch. The distributed storage system has five groups, that is, a subsystem A, a subsystem B, a subsystem C, a node pool 1, and a node pool 2. The subsystem A to the subsystem C are obtained through division based on functions of the node 1 to the node 8. For example, the division is performed based on correlation of tasks executed on the nodes or a function of a node. The node pool 1 and the node pool 2 are obtained through division based on physical areas to which the node 1 to the node 8 belong. For example, the division is performed based on a deployment location of each node. It should be noted that FIG. 4 shows only the nodes that need to be upgraded in the distributed storage system, but it does not mean that only the nodes that need to be upgraded exist in the distributed storage system. One or more nodes that do not need to be upgraded may also exist in the distributed storage system.

In addition, the eight nodes as shown in FIG. 4 that need to be upgraded may include a scheduling node required for implementing the solution. Certainly, the scheduling node may also be a node that does not need to be upgraded in the distributed storage system. This is not limited herein. Generally, the scheduling node may be considered as a primary node in the distributed storage system, and is configured to manage an operation procedure such as an upgrade of the distributed storage system. If no primary node exists in the distributed storage system, a user or the distributed storage system may designate a node to be the scheduling node, that is, the primary node for managing the operation procedure such as the upgrade of the distributed storage system.

Figure 5:
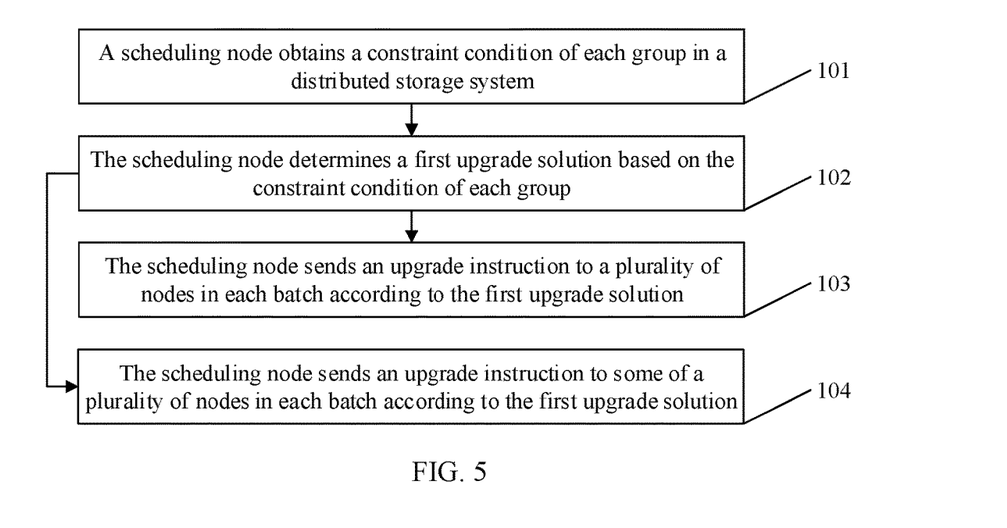
FIG. 5 is a flowchart of a distributed storage system upgrade management method according to an embodiment of the invention.

An embodiment of the invention provides a distributed storage system upgrade management method. As shown in FIG. 5, the method is implemented by the foregoing scheduling node. The method includes operation 101 to operation 103; or operation 101, operation 102, and operation 104.

Operation 101: The scheduling node obtains a constraint condition of each group in the distributed storage system.

The scheduling node needs to first determine nodes that need to be upgraded in the distributed storage system, and then determine respective constraint conditions of groups to which the nodes that need to be upgraded belong. In the embodiment of the invention, the scheduling node may obtain a list of nodes that need to be upgraded, from a local device, a third-party device such as a server, or another device by using a network, to determine the nodes that need to be upgraded. It should be noted that a manner in which the scheduling node determines the nodes that need to be upgraded is not limited to the foregoing several examples. This is not limited herein.

The obtained list of nodes that need to be upgraded may be obtained when the distributed storage system needs to be upgraded, and the scheduling node performs a subsequent upgrade process based on content recorded in the list. Certainly, the list may also be obtained by the scheduling node periodically or aperiodically. For example, the list may be obtained by the scheduling node at a preset time point or within a preset time range, or may be obtained by the scheduling node when the scheduling node is in an idle mode. This is not limited herein. The preset time point and the preset time range may be preset by the system maintenance personnel, and may be specifically adjusted based on factors such as a load change trend and a resource occupation status of the system. The idle mode may be considered as a state in which the scheduling node has sufficient resources to obtain the list, and/or the scheduling node has sufficient storage resources to store the list, or the like.

Similarly, in a process in which the scheduling node obtains the constraint condition, the constraint condition may also be obtained when the distributed storage system needs to be upgraded, or may be periodically or aperiodically obtained according to a preset rule. This is not limited herein. In addition, the constraint condition may be obtained from a local system, a third-party device such as a server, or another device by using a network. This is not limited herein.

Operation 102: The scheduling node determines a first upgrade solution based on the constraint condition of each group.

The first upgrade solution includes: grouping a plurality of nodes into at least one batch, where all nodes in each batch meet each constraint condition.

After obtaining the maximum quantity of nodes that are allowed to be upgraded simultaneously in each group, the scheduling node may determine at least one feasible upgrade solution based on a limitation of the constraint condition on the plurality of nodes that are upgraded simultaneously. The first upgrade solution is one of the at least one feasible solution. Because the first upgrade solution only needs to meet the constraint condition of each group, there may be a plurality of feasible upgrade solutions. For the plurality of feasible upgrade solutions, sifting may be further performed with reference to a current requirement for an upgrade process.

For example, there are more or fewer batches that need to be upgraded according to the plurality of feasible upgrade solutions. Generally, fewer upgrade batches indicate a shorter time consumed for the upgrade. Therefore, an upgrade solution used to upgrade fewest upgrade batches may be used as the first upgrade solution mentioned in the embodiment of the invention.

For another example, to minimize an impact on system reliability, relatively few nodes are generally upgraded at a time, and fewer nodes that are upgraded at a time indicates more upgrade batches. In this case, an upgrade solution used to upgrade most upgrade batches may be used as the first upgrade solution mentioned in the embodiment of the invention.

Similarly, to balance the upgrade time and the system reliability, an upgrade solution used to upgrade a proper quantity of upgrade batches may be selected as a preferred solution, that is, the first upgrade solution mentioned in the embodiment of the invention.

It should be noted that the foregoing sifting process for the plurality of feasible upgrade solutions is only a possible example, and is not used as a limitation on the embodiment of the invention. In addition to the time consumed for the upgrade and the system reliability, factors such as a system load and an idle resource may also be considered, and the first upgrade solution that is applicable to the current requirement may be selected more accurately. This is not described herein again.

In the embodiment of the invention, the first upgrade solution may be determined when the distributed storage system needs to be upgraded, or may be determined at another moment, for example, when a system load is relatively low or system resources are relatively sufficient. In other words, the first upgrade solution may be determined periodically or aperiodically, or may be determined when the distributed storage system is to be upgraded. Compared with the foregoing occasion for determining the first upgrade solution, the latter occasion for determining the first upgrade solution is more time-effective, which can ensure that the determined first upgrade solution is applicable to a case whether each node currently needs to be upgraded. In the foregoing occasion for determining the first upgrade solution, an error may exist although the system load can be minimized. For example, a node does not need to be upgraded at a previous moment. Therefore, the determined first upgrade solution does not include the node. As a result, the node fails to be upgraded in the upgrade process, and a remedial measure such as a secondary upgrade process is further required to complete the upgrade of the node. It can be learned that the two occasions for determining the first upgrade solution in the foregoing example each have advantages and disadvantages. With reference to an actual status of a current system and a requirement of the system for upgrade time-effectiveness, the system maintenance personnel may pre-configure an occasion for generating the first upgrade solution by the scheduling node, so that the scheduling node uses a solution more applicable to the current application scenario to generate the first upgrade solution.

Figure 6:
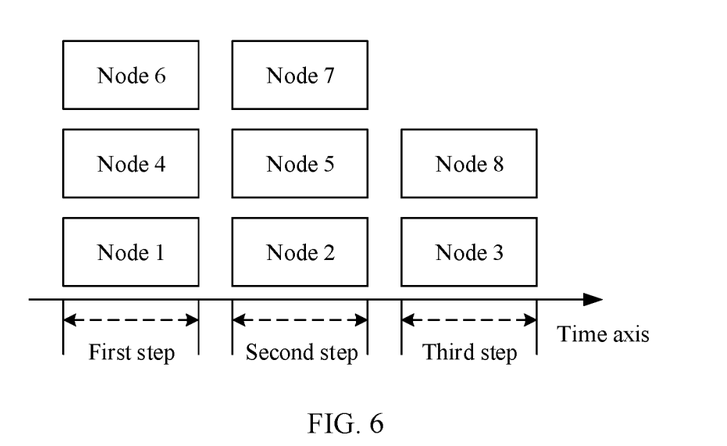
FIG. 6 is a schematic diagram of an upgrade of a distributed storage system according to an embodiment of the invention.

FIG. 6 is a schematic diagram of a possible execution process of an upgrade solution according to an embodiment of the invention. The distributed storage system in FIG. 4 is used as an example. If it is obtained that the first upgrade solution is used for three batches, a first batch includes the node 1, a node 4, and a node 6, a second batch includes a node 2, a node 5, and a node 7, and a third batch includes a node 3 and the node 8, the distributed storage system is upgraded through upgrade of the three batches to ensure that each to-be-upgraded node is upgraded. It should be noted that, in a process of determining the first upgrade solution, a node that needs to be upgraded in each of the three batches may be obtained by avoiding a limitation of the constraint condition, and there is no excessive requirement on a batch of nodes that are upgraded first and a batch of nodes that are upgraded later. In the embodiment of the invention, a batch that occupies shorter upgrade time may be upgraded first based on a time consumed for a node upgrade, so that more nodes in the system can complete the upgrade as soon as possible, thereby minimizing an impact on the system. Certainly, a batch to which a node with a lower load belongs may also be upgraded first based on a load status of the node, so that service execution on the node can be reduced as much as possible. It should be noted that the manner of determining the first upgrade solution is only a possible implementation, and is not used as a limitation on the embodiment of the invention.

Operation 103: The scheduling node sends an upgrade instruction to a plurality of nodes in each batch according to the first upgrade solution.

Operation 104: The scheduling node sends an upgrade instruction to some of a plurality of nodes in each batch according to the first upgrade solution.

In the embodiment of the invention, the scheduling node may complete, according to the first upgrade solution, an upgrade process of each node that needs to be upgraded in each batch. In addition, it is considered that after the upgrade process of nodes in some batches is completed, a quantity of nodes that need to be upgraded decreases, and more nodes may be upgraded in a batch after the quantity of nodes that need to be upgraded decreases. In this case, before a batch is upgraded according to the first upgrade solution, it may be found that the first upgrade solution is not a current best or better upgrade solution. To upgrade nodes that need to be upgraded in a same batch as many as possible and to save an upgrade time of the distributed storage system, the scheduling node may complete the upgrade process of nodes in only one batch or several batches according to the first upgrade solution, then generate a second upgrade solution based on the obtained constraint condition, and complete, according to the second upgrade solution, an upgrade process of remaining nodes that need to be upgraded. The first upgrade solution is different from the second upgrade solution.

In an implementation, a plurality of upgrade solutions are generated. In comparison with this implementation, only the first upgrade solution is generated, to minimize occupied system resources when the nodes are upgraded in parallel. In an implementation, only the first upgrade solution is generated. In comparison with this implementation, the plurality of upgrade solutions are generated, to save a time consumed for upgrading a same node to some extent, improve upgrade efficiency of the system, and minimize an impact on a service being executed.

It should be noted that the upgrade solution is not limited to the first upgrade solution and the second upgrade solution. In the embodiment of the invention, if saving system resources occupied by calculation and analysis is more considered, the scheduling node may generate only the first upgrade solution, and upgrades, according to the first upgrade solution, all of the plurality of nodes that need to be upgraded in each batch. If saving the time consumed for the system upgrade is more considered, the scheduling node may first generate the first upgrade solution, and complete, according to the first upgrade solution, an upgrade process of only one batch of nodes that need to be upgraded; the scheduling node generates the second upgrade solution, and similarly, completes, according to the second upgrade solution, an upgrade process of only one batch of nodes that need to be upgraded; and then the scheduling node generates a third upgrade solution, and so on, until all nodes that are not upgraded are upgraded. To balance the system resources and the upgrade time, the scheduling node may complete an upgrade process of some nodes according to the first upgrade solution, and then generate the second upgrade solution to complete an upgrade process of remaining nodes. The foregoing implementation process is merely a possible example, and is not intended to limit the embodiment of the invention. The scheduling node completes the system upgrade according to one or more upgrade solutions. Factors such as a system resource, an upgrade time, and a current load status of the system may be considered. This is not described herein.

In addition, different nodes in a same batch may occupy a same upgrade time or different upgrade times. After a node that occupies a longest upgrade time in the batch completes the upgrade process, an upgrade process of to-be-upgraded nodes in a next batch may be started.

It should be noted that the upgrade process of the nodes is a process in which the scheduling node determines the upgrade solution, and then sends an upgrade instruction to the nodes in each batch, to instruct upgrades of all nodes in a same batch at a same moment.

In comparison with a rolling upgrade manner, in the embodiment of the invention, the scheduling node may determine, based on a constraint condition of each of a plurality of groups, the first upgrade solution that meets the constraint condition, and upgrade some or all to-be-upgraded nodes in each batch according to the first upgrade solution. It can be learned that a quantity of nodes in an upgrade state at a same moment increases from one to more. In addition, there is no interference between the plurality of nodes that are upgraded simultaneously. Therefore, this parallel upgrade manner is used to not only ensure system reliability, but also save a time consumed for system upgrade. In this way, a problem of excessively low upgrade efficiency of the distributed storage system is resolved.

In order that the system upgrade process more meets the current requirements of the maintenance personnel, for example, in order to minimize the time occupied by the system upgrade, in a possible implementation of the embodiment of the invention, the scheduling node may send the upgrade instruction to only some of the plurality of nodes in each batch according to the first upgrade solution, then determines the second upgrade solution for nodes that are not upgraded, and sends, according to the second upgrade solution, the upgrade instruction to some or all of the nodes that are not upgraded in each batch. Similarly, if only some nodes are upgraded, a third upgrade solution needs to be generated, and so on, until all the nodes are upgraded. Therefore, based on the implementation shown in FIG. 5, an implementation shown in FIG. 7 may be further implemented. After performing operation 104 in which the scheduling node sends the upgrade instruction to some of the plurality of nodes in each batch according to the first upgrade solution, the scheduling node may further perform operation 201 and operation 202.

Figure 7:
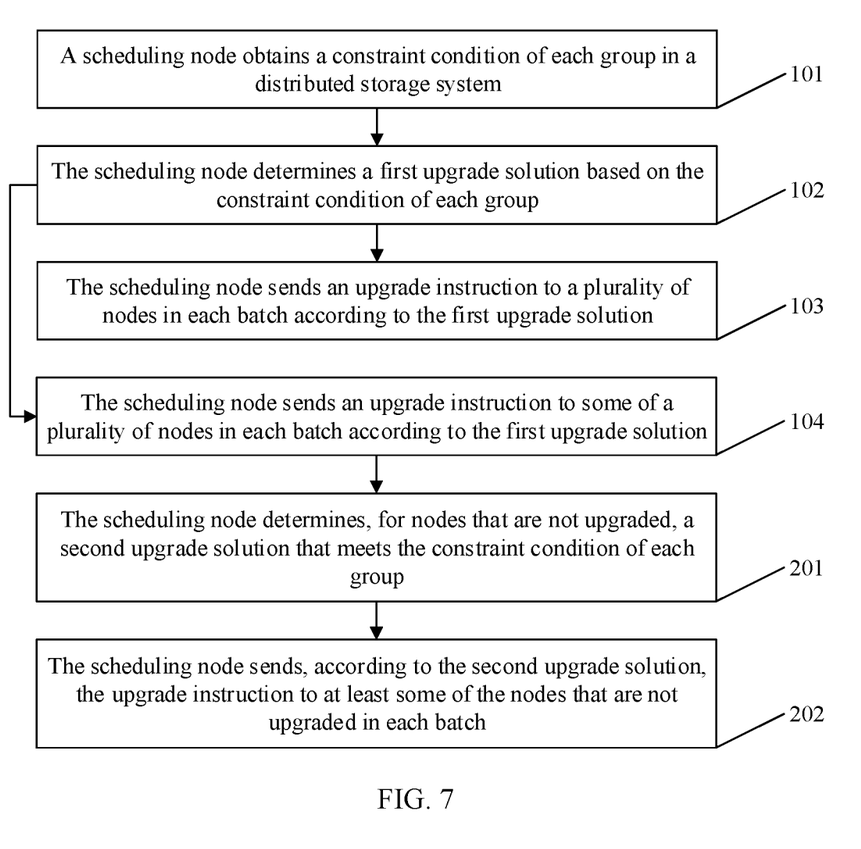
FIG. 7 is a flowchart of another distributed storage system upgrade management method according to an embodiment of the invention.

Operation 201: The scheduling node determines, for nodes that are not upgraded, a second upgrade solution that meets the constraint condition of each group.

The second upgrade solution includes: grouping, into at least one batch, the nodes that are not upgraded.

Operation 202: The scheduling node sends, according to the second upgrade solution, the upgrade instruction to at least some of the nodes that are not upgraded in each batch.

As shown in FIG. 6, the scheduling node completes an upgrade of a first batch of to-be-upgraded nodes according to the first upgrade solution, to be specific, completes an upgrade of a node 1, a node 4, and a node 6. Then, the scheduling node generates the second upgrade solution that meets the constraint condition of each group. In the second upgrade solution, it is possible that a node 2, a node 5, a node 7, and a node 3 can be upgraded simultaneously, and then a node 8 is upgraded; or the node 2, the node 5, the node 7, and the node 8 can be upgraded simultaneously, and then the node 3 is upgraded. Certainly, it is alternatively possible that the node 2, the node 5, the node 7, the node 3, and the node 8 can be upgraded in a same batch. It can be learned that, after the to-be-upgraded nodes are reduced, the upgrade solution may also change. For example, upgrade batches are reduced, or a quantity of nodes that can be upgraded in a same batch is increased. This is not enumerated herein.

Figure 8:
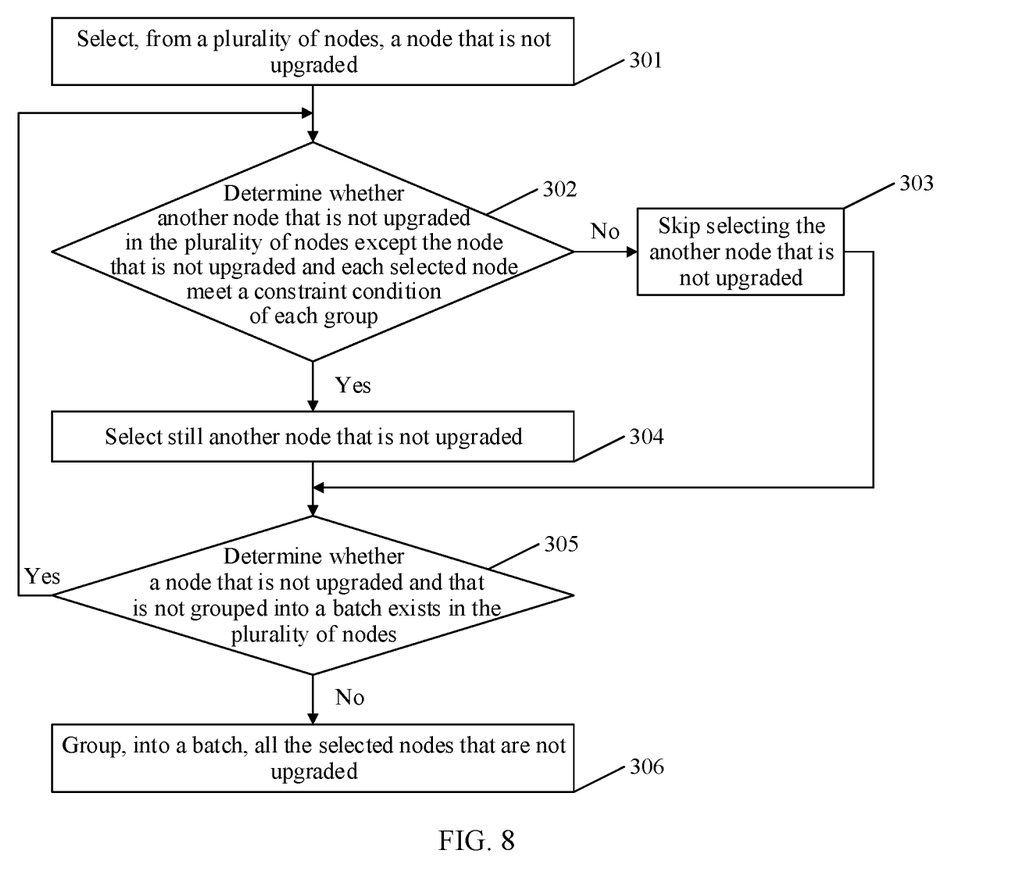
FIG. 8 is a flowchart of a method for determining a first upgrade solution according to an embodiment of the invention.

In the embodiment of the invention, a possible implementation of generating the first upgrade solution is provided. Based on the implementation shown in FIG. 5 or FIG. 7, operation 102 in which the scheduling node determines the first upgrade solution based on the constraint condition of each group may be implemented as an implementation shown in FIG. 8. FIG. 8 includes the following operations.

It should be noted that a node that receives the upgrade instruction will be upgraded. A storage node is restarted in an upgrade process or after an upgrade is completed.

Operation 301: Select, from a plurality of nodes, a node that is not upgraded.

It should be noted that, to avoid repetition in a selection process, all nodes that are not upgraded may be sorted and then selected one by one. Herein, the nodes may be sorted based on one or more factors such as a deployment location of a node, a current load status of the node, importance of a service executed by the node, and an occupied upgrade time of the node. A sorting manner is not limited herein. The sorting manner may be deployed in advance by the system maintenance personnel based on an actual requirement of a system upgrade.

The node that is not upgraded and that is initially selected herein may be a first node in a sorting order or a last node in the sorting order. Certainly, the nodes may alternatively be a first node in a order that is selected in the sorting according to the order. This is not limited herein. The order may be preconfigured by the system maintenance personnel, or may be an order obtained for the system based on a parameter such as a current load status of the system.

Operation 302: Determine whether another node that is not upgraded in the plurality of nodes except the node that is not upgraded and each selected node meet the constraint condition of each group. If the constraint condition is not met, operation 303 is performed; or if the constraint condition is met, operation 304 is performed.

Operation 303: Skip selecting the another node that is not upgraded, and perform operation 305.

Operation 304: Select still another node that is not upgraded, and perform operation 305.

Operation 305: Determine whether a node that is not upgraded and that is not grouped into a batch exists in the plurality of nodes. If the node exists, operation 302 is performed; or if the node does not exist, operation 306 is performed.

Operation 306: Group, into a batch, all the selected nodes that are not upgraded.

For the nodes that are not selected and that are not upgraded, the process from operation 301 to operation 306 is repeated until all the nodes that are not upgraded are grouped into batches. It should be noted that a batch of nodes that are not upgraded may be obtained each time operation 301 to operation 306 are performed.

The foregoing implementation of generating the first upgrade solution is only a possible implementation. In the embodiment of the invention, another implementation of generating the first upgrade solution may be used, for example, a derivative manner of the foregoing implementation. For example, when the nodes that need to be upgraded are sorted, the nodes may be sorted in descending order of effects of the constraint condition on the nodes. To be specific, a node that is most limited by the constraint condition is used as the node that is not upgraded and that is selected in the foregoing operation 302, and a node that is second most limited by the constraint condition is used as the another node that is not upgraded and that is selected for the first time other than the node that is not upgraded. In the embodiment of the invention, it only needs to ensure that the generated first upgrade solution can meet the constraint condition of each group.

It can be learned that, for the sorting, different sorting manners also indicate different content of the first upgrade solution, and for upgrade solutions with same batch division, a sequence of upgrading each batch also indicates a difference between the upgrade solutions. The difference is not a difference between upgrade times, and is possible to affect the service execution on each node in the system. Therefore, the first upgrade solution still needs to be generated with reference to an actual status of a current system, and a generation manner is not limited herein. The foregoing implementation is only a possible example.

In order that a constraint condition of a group is not omitted, in a possible implementation of the embodiment of the invention, the scheduling node may send a constraint condition request message separately to all the nodes that need to be upgraded, to obtain the constraint condition of each group. Therefore, based on the implementation shown in FIG. 5 or FIG. 7, when FIG. 5 is used as an example, there may be an implementation shown in FIG. 9. Operation 101 in which the scheduling node obtains the constraint condition of each group in the distributed storage system may be implemented as operation 401 and operation 402.

Figure 9:
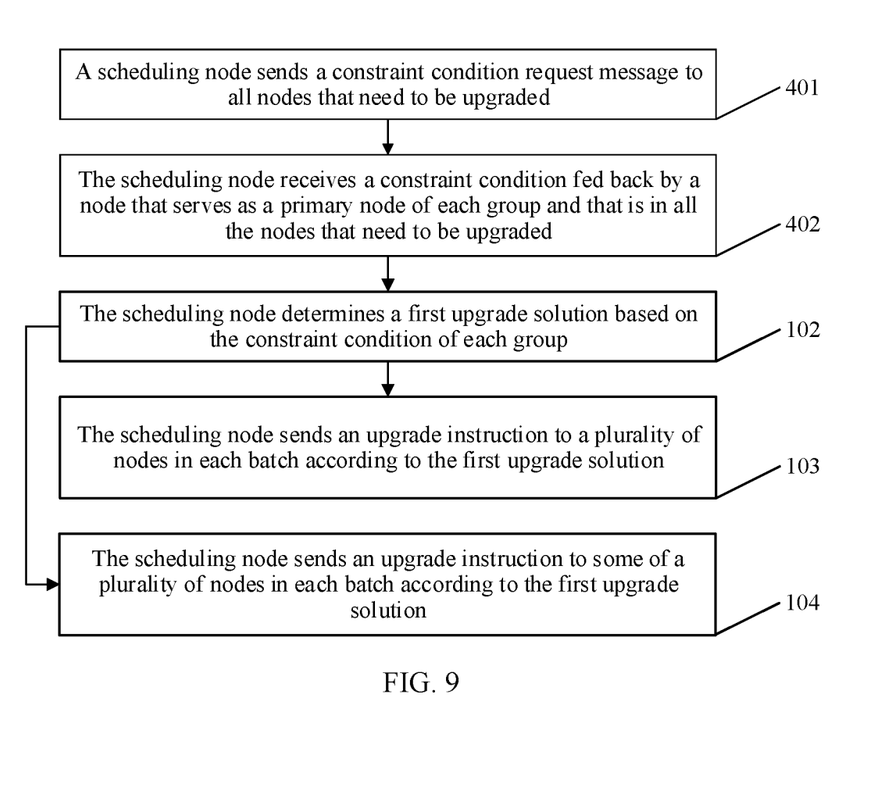
FIG. 9 is a flowchart of another distributed storage system upgrade management method according to an embodiment of the invention.

Operation 401: The scheduling node sends a constraint condition request message to all nodes that need to be upgraded.

Operation 402: The scheduling node receives a constraint condition fed back by a node that serves as a primary node of each group and that is in all the nodes that need to be upgraded.

Generally, each group also has a primary node or a node similar to the primary node that is configured to manage other nodes in the group. The primary node generally has a capability of communicating with another node in the group. When the scheduling node does not know nodes serving as primary nodes of the groups, in order that some constraint conditions are not omitted, the scheduling node needs to send a constraint condition request message to each node. After receiving the message, the primary node feeds back, to the scheduling node, a constraint condition of a group to which the primary node belongs, and a non-primary node may not feed back the constraint condition after receiving the message. It should be noted that a same node may be used as a primary node of one or more groups. A setting manner of a primary node of a group is not limited herein.

Figure 10:
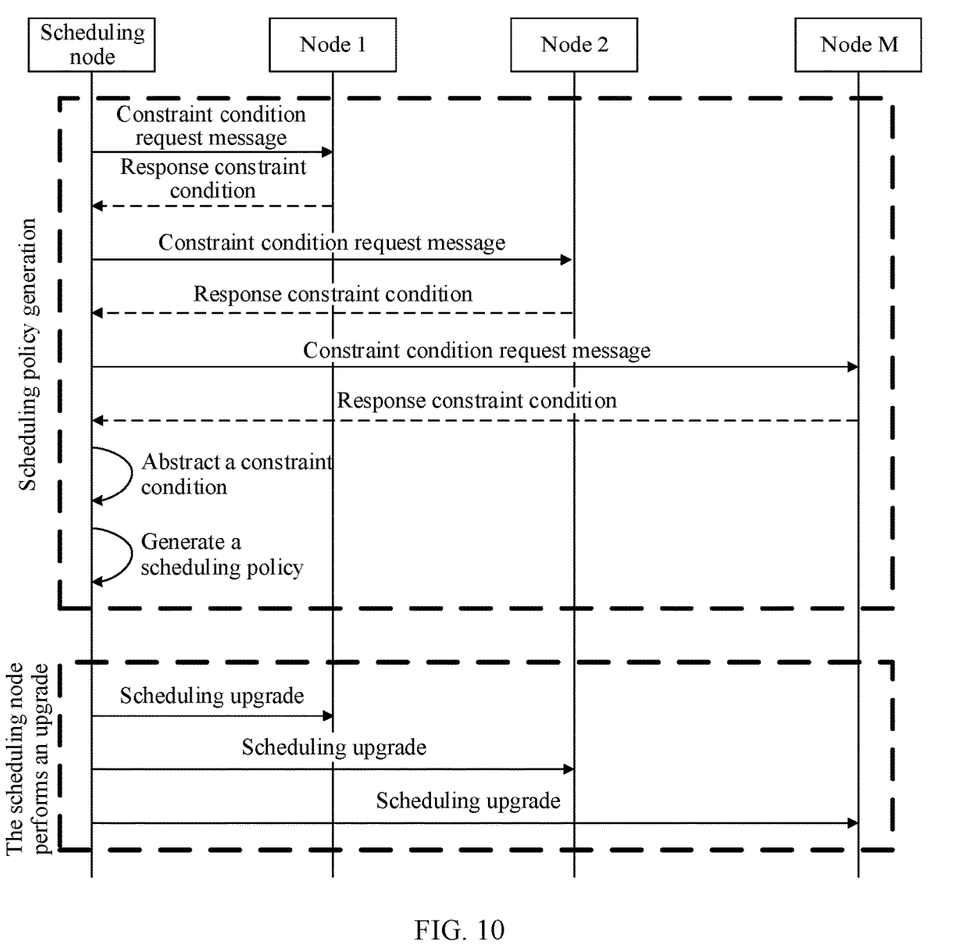
FIG. 10 is an interaction diagram of a distributed storage system upgrade management method according to an embodiment of the invention.

FIG. 10 shows a possible upgrade process of a distributed storage system according to an embodiment of the invention. In FIG. 10, a scheduling node does not need to be upgraded, and a node 1 to a node M are to-be-upgraded nodes, where M is an integer greater than 1.

The scheduling node sends the constraint condition request message to the node 1 separately to the node M, and receives response constraint conditions of some or all of the nodes. It should be noted that, if all the nodes are primary nodes of the groups and know constraint conditions of the groups to which the nodes belong, or all the nodes have a response capability and know constraint conditions of the groups to which the nodes belong, all the nodes feed back the constraint conditions to the scheduling node. In addition, the system maintenance personnel may also preconfigure a capability of each node. For example, to save resources consumed for output transmission, the system maintenance personnel may specify a node in each group as a node for responding to the constraint condition request message. Alternatively, to avoid a case in which the scheduling node obtains an incomplete constraint condition due to packet loss, the system maintenance personnel specifies at least two nodes in a same group as nodes for responding to the constraint condition request message. Herein, a quantity of response constraint conditions, an attribute of the response constraint condition, or the like is not limited.

After receiving the constraint condition fed back for each group, the scheduling node may abstract the constraint condition to facilitate generation of a scheduling policy, that is, the upgrade solution. For example, a constraint condition set of the distributed storage system is that one node is restarted simultaneously at most in Y={NODE1, NODE2, NODE3}; two nodes are restarted simultaneously at most in {NODE4, . . . , NODE8}; three nodes are restarted simultaneously at most in {NODE1, . . . , NODE7}; and two nodes are restarted simultaneously at most in {NODE1, . . . , NODE5}. Herein, NODE is used to represent a node in the distributed storage system, and {NODE4, . . . , NODE8} represents a node set including the node 4 to the node 8. Similarly, {NODE1, . . . , NODE7} represents a node set including the node 1 to the node 7, and {NODE1, . . . , NODE5} represents a node set including the node 1 to the node 5. Because the nodes are restarted in an upgrade process, a maximum quantity of nodes that can be restarted simultaneously may be considered as a maximum quantity of nodes that can be upgraded simultaneously. Then the scheduling node generates the first upgrade solution by using operations shown in operation 301 to operation 306, and schedules the node 1 to the node M in each batch according to the first upgrade solution to complete the upgrade.

It should be noted that the foregoing implementation solution applied to the distributed storage system may also be applied to another distributed system such as a distributed computing system. Details are not described herein.

The foregoing scheduling node may be or is configured with a distributed storage system upgrade management apparatus. To implement the foregoing functions, the distributed storage system upgrade management apparatus includes a corresponding hardware structure and/or software module for executing each function. One of ordinary skill in the art should easily be aware that, in combination with the example units and algorithms operations described in the embodiments disclosed in this specification, the invention can be implemented by hardware or a combination of hardware and computer software. Whether a function is performed by hardware or hardware driven by computer software depends on particular applications and design constraints of the technical solutions. One of ordinary skill in the art may use different methods to implement the described functions for each particular application, but it should not be considered that such implementation goes beyond the scope of the invention.

In the embodiments of the invention, function modules of the distributed storage system upgrade management apparatus may be obtained through division according to the foregoing method examples. For example, each function module may be obtained through division in accordance with each function, or two or more functions may be integrated into one processing module. The integrated module may be implemented in a form of hardware, or may be implemented in a form of a software function module. It should be noted that the module division in the embodiments of the invention is an example, and is merely logical function division. There may be another division manner in an actual implementation.

Figure 11:
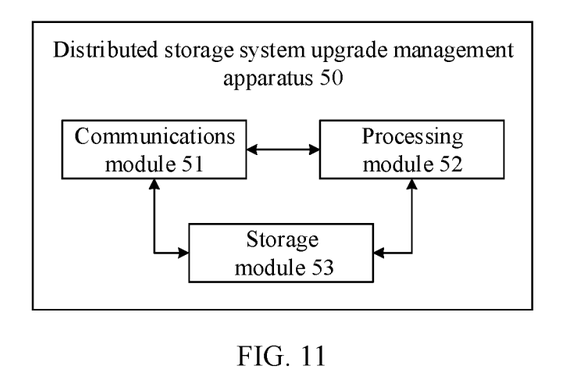
FIG. 11 is a schematic structural diagram of a distributed storage system upgrade management apparatus according to an embodiment of the invention.

FIG. 11 is a possible schematic structural diagram of a distributed storage system upgrade management apparatus according to an embodiment. A distributed storage system upgrade management apparatus 50 includes a communications module 51 and a processing module 52. The communications module 51 is configured to support the distributed storage system upgrade management apparatus 50 in performing operation 101 in FIG. 5 and FIG. 7, and operation 401 and operation 402 in FIG. 9; and configured to: support the distributed storage system upgrade management apparatus 50 in performing data interaction with each module in a scheduling node, and/or support communication between the scheduling node and a device such as another node. The processing module 52 is configured to support the distributed storage system upgrade management apparatus 50 in performing operation 102 to operation 104 in FIG. 5, FIG. 7, and FIG. 9, operation 201 and operation 202 in FIG. 7, and operation 301 to operation 307 in FIG. 8, and/or other processes of the technologies described in this specification. In the embodiment of the invention, the distributed storage system upgrade management apparatus 50 may further include a storage module 53, configured to store program code and data of the scheduling node.

The processing module 52 may be implemented as a processor or a controller, such as a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processing unit 52 may implement or execute various example logical blocks, modules, and circuits described with reference to content disclosed in the invention. Alternatively, the processor may be a combination for implementing a computing function, for example, a combination of one or more microprocessors or a combination of a DSP and a microprocessor. The communications module 51 may be implemented as a transceiver, a transceiver circuit, a communications interface, or the like. The storage module 53 may be implemented as a memory.

Figure 12:
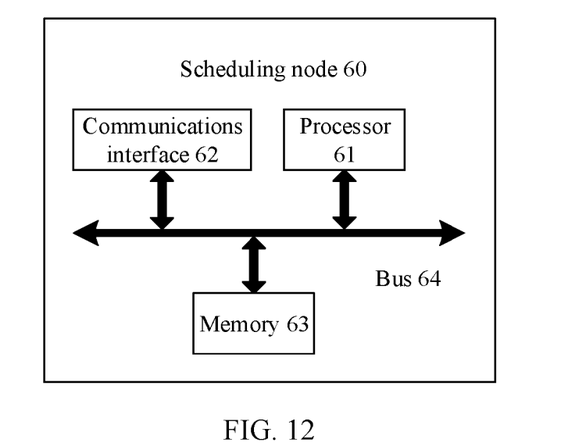
FIG. 12 is a schematic structural diagram of a scheduling node according to an embodiment of the invention.

If the processing module 52 is implemented as a processor, the communications module 51 is implemented as a communications interface, and the storage module 53 is implemented as a memory, as shown in FIG. 12, a scheduling node 60 includes: a processor 61, a communications interface 62, a memory 63, and a bus 64. The processor 61, the communications interface 62, and the memory 63 are connected to each other by using the bus 64. The bus 64 may be a peripheral component interconnect (PCI) bus, an extended industry standard architecture (EISA) bus, or the like. The bus may be classified into an address bus, a data bus, a control bus, and the like. For ease of indication, the bus is indicated by using only one bold line in FIG. 12. However, it does not indicate that there is only one bus or only one type of bus.

Method or algorithm operations described with reference to the content disclosed in the invention may be implemented by hardware, or may be implemented by a processor by executing a software instruction. The software instruction may include a corresponding software module. The software module may be stored in a random access memory (RAM), a flash memory, a read-only memory (ROM), an erasable programmable read only memory (EPROM), an electrically erasable programmable read only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium and can write information into the storage medium. Certainly, the storage medium may also be a component of the processor. The processor and the storage medium may be deployed in a same device, or the processor and the storage medium may be deployed in different devices as discrete components.

An embodiment of the invention provides a distributed storage system. The distributed storage system includes a plurality of nodes. Each node belongs to at least one group. The distributed storage system includes:

a scheduling node, configured to: obtain a constraint condition of each group in the distributed storage system, where the constraint condition includes a maximum quantity of nodes in each group that are allowed to be upgraded in parallel; determine a first upgrade solution based on the constraint condition of each group, where the first upgrade solution includes: grouping the plurality of nodes into at least one batch, where all nodes in each batch meet each constraint condition; and then send an upgrade instruction to the plurality of nodes in each batch according to the first upgrade solution; or a scheduling node, configured to: obtain a constraint condition of each group in the distributed storage system, where the constraint condition includes a maximum quantity of nodes in each group that are allowed to be upgraded in parallel; determine a first upgrade solution based on the constraint condition of each group, where the first upgrade solution includes: grouping the plurality of nodes into at least one batch, where all nodes in each batch meet each constraint condition; and then send an upgrade instruction to some of the plurality of nodes in each batch according to the first upgrade solution.

In a possible design, nodes belonging to a same group have a same function or belong to a same physical area.

In a possible design, the scheduling node is further configured to:

a. select, from the plurality of nodes, a node that is not upgraded;

b. determine whether another node that is not upgraded in the plurality of nodes except the node that is not upgraded and each selected node that is not upgraded meet the constraint condition of each group, and if the another node and each selected node that is not upgraded meet the constraint condition of each group, select the another node that is not upgraded, until all the nodes that are not upgraded in the plurality of nodes are traversed; and c. group, into a batch, all the nodes that are not upgraded and that are selected in a and b; and repeat the process from a to c for nodes that are not upgraded and that are not selected, until batch division is completed for all the nodes that are not upgraded.

In a possible design, after the scheduling node sends the upgrade instruction to some of the plurality of nodes in each batch according to the first upgrade solution, the scheduling node is further configured to:

determine, for nodes that are not upgraded, a second upgrade solution that meets the constraint condition of each group, where the first upgrade solution is different from the second upgrade solution, and the second upgrade solution includes: grouping, into at least one batch, the nodes that are not upgraded; and send, according to the second upgrade solution, the upgrade instruction to at least some of the nodes that are not upgraded in each batch.

One of ordinary skill in the art should be aware that in the foregoing one or more examples, functions described in the embodiments of the invention may be implemented by hardware, software, firmware, or any combination thereof. When these functions are implemented by software, the functions may be stored in a computer readable medium or transmitted as one or more instructions or code in the computer readable medium. The computer readable medium includes a computer storage medium and a communications medium. The communications medium includes any medium that facilitates transmission of a computer program from one place to another. The storage medium may be any available medium accessible to a general-purpose computer or a dedicated computer.

What is claimed is:

1. An upgrade management method in a storage system comprising a plurality of nodes, the plurality of the nodes being divided into groups; the upgrade management method comprising:

obtaining, by a scheduling node in the storage system, a respective constraint condition of each group, wherein the respective constraint condition comprises a maximum quantity of the nodes in a corresponding group that are allowed to be upgraded in parallel;

selecting, by the scheduling node, a portion of nodes from the plurality of nodes from each group for a first batch for upgrading in parallel based on the respective constraint condition of each group, wherein nodes not in the portion of the nodes selected from each group are not in the first batch and are not upgraded in parallel; and sending, by the scheduling node, an upgrade instruction to the nodes in the first batch.

2. The method according to claim 1, wherein the nodes in a group have a same function or belong to a same physical area.

3. The method according to claim 1, further comprising:

selecting, by the scheduling node, nodes in a second batch, that are not in the first batch, for upgrading in parallel from the groups based on the respective constraint condition of each group; and sending, by the scheduling node, an upgrade instruction to the nodes in the second batch.

4. The method according to claim 1, wherein each of the groups comprises a portion of the plurality of the nodes that are unsuitable to be restarted simultaneously.

5. The method according to claim 1, wherein the constraint condition of each group specifies a number of nodes of each group that can be restarted simultaneously, the number of nodes being less than a total number of nodes in each group.

6. A scheduling node in a storage system comprising a plurality of nodes, the plurality of nodes being divided into groups; an interface that is configured to communicate with a processor; wherein the processor is configured to:

obtain a respective constraint condition of each group, wherein the respective constraint condition comprises a maximum quantity of the nodes in a corresponding group that are allowed to be upgraded in parallel;

select a portion of the plurality of nodes from the plurality of nodes fef from each group for a first batch for upgrading in parallel based on the respective constraint condition of each group, wherein nodes not in the portion of the nodes selected fef from each group are not in the first batch and are not upgraded in parallel; and send an upgrade instruction to the nodes in the first batch.

7. The scheduling node according to claim 6, wherein the nodes in a group have a same function or belong to a same physical area.

8. The scheduling node according to claim 6, wherein the processor is further configured to:

select nodes in a second batch, that are not in the first batch, for upgrading in parallel from the groups based on the respective constraint condition of each group; and send an upgrade instruction to the nodes in the second batch.

9. The scheduling node according to claim 6, wherein each of the groups comprises a portion of the plurality of the nodes that are unsuitable to be restarted simultaneously.

10. The scheduling node according to claim 6, wherein the constraint condition of each group specifies a number of nodes of each group that can be restarted simultaneously, the number of nodes being less than a total number of nodes in each group.

11. A storage system comprising a scheduling node and a plurality of nodes, the plurality of the nodes being divided into groups; wherein the scheduling node is configured to:
  obtain a respective constraint condition of each group, wherein the respective constraint condition comprises a maximum quantity of the nodes in a corresponding group that are allowed to be upgraded in parallel;
  select a portion of the plurality of nodes from the plurality of nodes fef from each group for a first batch for upgrading in parallel based on the respective constraint condition of each group, wherein nodes not in the portion of the nodes selected fef from each group are not in the first batch and are not upgraded in parallel; and
  send an upgrade instruction to the nodes in the first batch.

12. The storage system according to claim 11, wherein the nodes in a group have a same function or belong to a same physical area.

13. The storage system according to claim 11, wherein the scheduling node is further configured to:
  select nodes in a second batch, that are not in the first batch, for upgrading in parallel from the groups based on the respective condition of each group; and
  send an upgrade instruction to the nodes in the second batch.

14. The storage system according to claim 11, wherein each of the groups comprises a portion of the plurality of the nodes that are unsuitable to be restarted simultaneously.

15. The storage system according to claim 11, wherein the constraint condition of each group specifies a number of nodes of each group that can be restarted simultaneously, the number of nodes being less than a total number of nodes in each group.

16. A non-volatile computer readable storage medium, wherein the non-volatile computer readable storage medium stores a computer instruction that is used to be executed by a processor of a scheduling node in a storage system comprising a plurality of nodes, the plurality of the nodes being divided into groups; wherein the processor executes the computer instruction to perform operations comprising:
  obtaining a respective constraint condition of each group, wherein the respective constraint condition comprises a maximum quantity of the nodes in corresponding group that are allowed to be upgraded in parallel;
  selecting a portion of the plurality of nodes from the plurality of nodes for from each group for a first batch for upgrading in parallel based on the respective constraint condition of each group, wherein nodes not in the portion of the nodes selected for from each group are not in the first batch and are not upgraded in parallel; and
  sending an upgrade instruction to the nodes in the first batch.

17. The non-volatile computer readable storage medium according to claim 16, wherein the processor further executes the computer instruction to perform operations comprising:
  selecting the nodes in a second batch, that are not in the first batch, for upgrading in parallel from the groups based on the respective constraint condition of each group; and
  sending an upgrade instruction to the nodes in the second batch.

18. The non-volatile computer readable storage medium according to claim 10, wherein each of the groups comprises a portion of the plurality of the nodes that are unsuitable to be restarted simultaneously.

19. The non-volatile computer readable storage medium according to claim 10, wherein the constraint condition of each group specifies a number of nodes of each group that can be restarted simultaneously, the number of nodes being less than a total number of nodes in each group.

* * * * *

UNITED STATES PATENT AND TRADEMARK OFFICE
CERTIFICATE OF CORRECTION

PATENT NO. : 11,526,276 B2
APPLICATION NO. : 16/822754
DATED : December 13, 2022
INVENTOR(S) : Fei Xu It is certified that error appears in the above-identified patent and that said Letters Patent is hereby corrected as shown below:

In the Claims

In Claim 6, Column 18, Line 47, "fef" should be deleted.

In Claim 6, Column 18, Line 50, "fef" should be deleted.

In Claim 11, Column 19, Line 14, "fef" should be deleted.

In Claim 11, Column 19, Line 17, "fef" should be deleted.

In Claim 16, Column 20, Line 11, "for" should be deleted.

In Claim 16, Column 20, Line 14, "for" should be deleted.

In Claim 18, Column 20, Line 31, "claim 10" should be --claim 16--.

In Claim 19, Column 20, Line 36, "claim 10" should be --claim 16--.

Signed and Sealed this
Fourteenth Day of March, 2023

Katherine Kelly Vidal
*Director of the United States Patent and Trademark Office*